(12) United States Patent
Wang et al.

(10) Patent No.: US 9,934,423 B2
(45) Date of Patent: Apr. 3, 2018

(54) COMPUTERIZED PROMINENT CHARACTER RECOGNITION IN VIDEOS

(71) Applicant: Microsoft Technology Licensing, LLC, Redmond, WA (US)

(72) Inventors: Tzong-Jhy Wang, Seattle, WA (US); Nitin Suri, Redmond, WA (US); Andrew S. Ivory, Woodinville, WA (US); William D. Sproule, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/445,518

(22) Filed: Jul. 29, 2014

(65) Prior Publication Data

US 2016/0034748 A1 Feb. 4, 2016

(51) Int. Cl.
*G06K 9/46* (2006.01)
*G06K 9/00* (2006.01)

(52) U.S. Cl.
CPC ..... *G06K 9/00281* (2013.01); *G06K 9/00288* (2013.01); *G06K 9/00718* (2013.01); *G06K 9/4671* (2013.01); *G06K 9/00221* (2013.01)

(58) Field of Classification Search
None
See application file for complete search history.

(56) References Cited

U.S. PATENT DOCUMENTS 5,854,902 A * 12/1998 Wilson ............ G06F 17/30017 340/541
5,917,958 A * 6/1999 Nunally ............ G06F 17/30017 348/139

(Continued)

FOREIGN PATENT DOCUMENTS

WO WO0016243 A1 3/2000
WO WO2010006334 A1 1/2010
(Continued)

OTHER PUBLICATIONS

"Face SDK Beta", Microsoft Research, retrieved on Jul. 28, 2014 at <<ms-its:C:\Program Files (x86)\Microsoft Research\Face SDK Beta for Windows Phone\doc\Fac7e/2 S8D/2K01 M4 anual>>, 22 Pages.

(Continued)

*Primary Examiner* — Iman K Kholdebarin
(74) *Attorney, Agent, or Firm* — Arent Fox LLP

(57) ABSTRACT

Techniques for identifying prominent subjects in video content based on feature point extraction are described herein. Video files may be processed to detect faces on video frames and extract feature points from the video frames. Some video frames may include detected faces and extracted feature points and other video frames may not include detected faces. Based on the extracted feature points, faces may be inferred on video frames where no face was detected. The inferring may be based on feature points. Additionally, video frames may be arranged into groups and two or more groups may be merged. The merging may be based on some groups including video frames having overlapping feature points. The resulting groups each may identify a subject. A frequency representing a number of video frames where the subject appears may be determined for calculating a prominence score for each of the identified subjects in the video file.

23 Claims, 7 Drawing Sheets

(56) References Cited

U.S. PATENT DOCUMENTS

| | | | |
|---|---|---|---|
| 6,741,655 B1* | 5/2004 | Chang | G06F 17/30247 375/240.08 |
| 6,771,268 B1 | 8/2004 | Crinon | |
| 7,072,501 B2* | 7/2006 | Wood | A61B 6/032 382/132 |
| 7,383,504 B1 | 6/2008 | Divakaran et al. | |
| 7,386,170 B2* | 6/2008 | Ronk | G06F 17/30256 348/699 |
| 7,616,816 B2* | 11/2009 | Cheng | G06F 17/30241 382/181 |
| 7,707,008 B1 | 4/2010 | Champlin et al. | |
| 7,755,619 B2* | 7/2010 | Wang | G06T 17/20 345/419 |
| 7,881,505 B2 | 2/2011 | Schneiderman et al. | |
| 7,916,894 B1* | 3/2011 | Dhillon | G06F 17/30793 382/103 |
| 7,933,338 B1 | 4/2011 | Choudhry et al. | |
| 8,134,596 B2 | 3/2012 | Lei et al. | |
| 8,170,280 B2* | 5/2012 | Zhao | G06K 9/00295 382/103 |
| 8,185,543 B1 | 5/2012 | Choudhry et al. | |
| 8,189,880 B2 | 5/2012 | Wen et al. | |
| 8,200,063 B2 | 6/2012 | Chen et al. | |
| 8,311,344 B2 | 11/2012 | Dunlop et al. | |
| 8,379,154 B2 | 2/2013 | Zhang | |
| 8,452,778 B1 | 5/2013 | Song et al. | |
| 8,489,589 B2 | 7/2013 | Mei et al. | |
| 8,494,231 B2 | 7/2013 | Folta et al. | |
| 8,560,406 B1 | 10/2013 | Antony | |
| 8,565,536 B2 | 10/2013 | Liu | |
| 8,595,781 B2* | 11/2013 | Neumeier | H04N 5/44591 707/769 |
| 8,605,956 B2 | 12/2013 | Ross et al. | |
| 8,619,150 B2 | 12/2013 | Deever | |
| 8,661,029 B1* | 2/2014 | Kim | G06F 17/3053 707/723 |
| 8,687,941 B2 | 4/2014 | Dirik et al. | |
| 8,705,810 B2 | 4/2014 | Wang et al. | |
| 8,730,397 B1 | 5/2014 | Zhang | |
| 8,824,747 B2* | 9/2014 | Free | G06K 9/00234 382/118 |
| 9,025,866 B2 | 5/2015 | Liu | |
| 9,141,859 B2 | 9/2015 | Vunic | |
| 9,161,007 B2* | 10/2015 | Suri | G11B 27/034 |
| 9,245,190 B2* | 1/2016 | Rosenkrantz | G06K 9/00885 |
| 9,639,666 B2* | 5/2017 | Baker | G06F 19/3437 |
| 2003/0091235 A1 | 5/2003 | Xiong | |
| 2004/0010430 A1 | 1/2004 | Cinquini et al. | |
| 2004/0201609 A1 | 10/2004 | Obrador | |
| 2004/0202377 A1* | 10/2004 | Murakami | A47L 9/26 382/251 |
| 2004/0228503 A1* | 11/2004 | Cutler | G06K 9/00348 382/103 |
| 2005/0008198 A1 | 1/2005 | Guo et al. | |
| 2005/0084152 A1* | 4/2005 | McPeake | G06F 17/30985 382/173 |
| 2005/0198067 A1 | 9/2005 | Liu | |
| 2005/0289482 A1* | 12/2005 | Anthony | G06F 3/04815 715/851 |
| 2007/0019863 A1* | 1/2007 | Ito | G06K 9/00248 382/190 |
| 2007/0101269 A1 | 5/2007 | Hua et al. | |
| 2007/0183497 A1 | 8/2007 | Luo et al. | |
| 2007/0263128 A1 | 11/2007 | Zhang | |
| 2007/0289432 A1 | 12/2007 | Basu et al. | |
| 2008/0002771 A1 | 1/2008 | Chen | |
| 2008/0019661 A1 | 1/2008 | Obrador et al. | |
| 2008/0184120 A1 | 7/2008 | OBrien-Strain et al. | |
| 2008/0195981 A1 | 8/2008 | Pulier et al. | |
| 2009/0016576 A1* | 1/2009 | Goh | G06F 17/30256 382/118 |
| 2009/0079871 A1 | 3/2009 | Hua et al. | |
| 2009/0080853 A1 | 3/2009 | Chen et al. | |
| 2009/0141940 A1* | 6/2009 | Zhao | G06K 9/00295 382/103 |
| 2009/0169065 A1 | 7/2009 | Wang et al. | |
| 2009/0169168 A1* | 7/2009 | Ishikawa | G06F 17/30017 386/278 |
| 2009/0208106 A1 | 8/2009 | Dunlop et al. | |
| 2009/0292685 A1 | 11/2009 | Liu et al. | |
| 2010/0014717 A1* | 1/2010 | Rosenkrantz | G06K 9/00885 382/115 |
| 2010/0045799 A1 | 2/2010 | Lei et al. | |
| 2010/0054705 A1 | 3/2010 | Okamoto et al. | |
| 2010/0142803 A1 | 6/2010 | Wang et al. | |
| 2010/0306193 A1* | 12/2010 | Pereira | G06F 17/30784 707/728 |
| 2011/0113444 A1* | 5/2011 | Popovich | G06F 17/3079 725/32 |
| 2011/0211736 A1 | 9/2011 | Krupka et al. | |
| 2011/0243450 A1 | 10/2011 | Liu | |
| 2011/0249953 A1* | 10/2011 | Suri | G11B 27/034 386/239 |
| 2011/0263946 A1* | 10/2011 | el Kaliouby | A61B 5/1128 600/300 |
| 2011/0292232 A1* | 12/2011 | Zhang | G06F 17/30247 348/222.1 |
| 2011/0292288 A1* | 12/2011 | Deever | G06F 17/30784 348/590 |
| 2012/0095817 A1 | 4/2012 | Kamil et al. | |
| 2012/0230545 A1* | 9/2012 | Zhang | G06K 9/00221 382/103 |
| 2012/0233159 A1 | 9/2012 | Datta et al. | |
| 2012/0294540 A1 | 11/2012 | Sun et al. | |
| 2012/0301014 A1 | 11/2012 | Xiao et al. | |
| 2013/0051756 A1 | 2/2013 | Chao et al. | |
| 2013/0114942 A1* | 5/2013 | Yu | H04N 5/272 386/278 |
| 2013/0142418 A1 | 6/2013 | van Zwol et al. | |
| 2013/0148003 A1* | 6/2013 | Penev | H04N 5/23293 348/333.11 |
| 2013/0262462 A1* | 10/2013 | Srikrishna | G06F 17/30817 707/736 |
| 2013/0322765 A1* | 12/2013 | Neumann | G06K 9/00765 382/197 |
| 2014/0135966 A1 | 5/2014 | Pettersson et al. | |
| 2014/0201126 A1* | 7/2014 | Zadeh | G06N 7/005 706/52 |
| 2014/0270350 A1 | 9/2014 | Rodriguez-Serrano et al. | |
| 2014/0270441 A1* | 9/2014 | Baker | A61B 34/10 382/131 |
| 2014/0281961 A1* | 9/2014 | Baker | G06F 3/0484 715/705 |
| 2014/0282216 A1* | 9/2014 | Baker | G06F 19/3406 715/781 |
| 2014/0369422 A1* | 12/2014 | Wang | H04N 21/440218 375/240.26 |
| 2015/0082349 A1* | 3/2015 | Ishtiaq | H04N 21/23418 725/40 |
| 2015/0110349 A1* | 4/2015 | Feng | G06K 9/00234 382/103 |
| 2015/0142744 A1* | 5/2015 | Weinstein | G06Q 30/02 707/640 |
| 2015/0296228 A1 | 10/2015 | Chen et al. | |
| 2015/0363664 A1* | 12/2015 | Chang | G06K 9/46 382/164 |
| 2016/0034786 A1 | 2/2016 | Suri et al. | |
| 2016/0117749 A1 | 4/2016 | Desmarais et al. | |
| 2016/0267333 A1* | 9/2016 | Jung | G06K 9/00791 |

FOREIGN PATENT DOCUMENTS

| | | |
|---|---|---|
| WO | WO2012138828 A2 | 10/2012 |
| WO | WO2013063736 | 5/2013 |

OTHER PUBLICATIONS

"Feature detection (computer vision)", Retrieved on: Jun. 10, 2014, Available at: http://en.wikipedia.org/wiki/Feature_detection_(computer_vision), 3 pages.

(56) References Cited

OTHER PUBLICATIONS

Jiang, et al., "Automatic Consumer Video Summarization by Audio and Visual Analysis", In IEEE International Conference on Multimedia and Expo, Jul. 11, 2011, 6 pages.

Luthra, et al., "A Machine Learning based Approach to Video Summarization", Retrieved on: Apr. 30, 2014, Available at: http://www.cse.iitb.ac.in/~sharat/icvgip.org/ncvpripg2008/papers/24.pdf, 5 pages.

Ma, et al., "A User Attention Model for Video Summarization", In Proceedings of 10th ACM International Conference on Multimedia, Dec. 2002, 10 pages.

"Microsoft Research Face SDK Beta", retrieved on Jul. 28, 2014 at <<http://research.microsoft.com/en-us/projects/facesdk/default.aspx>>, 2 pages.

Sivic, et al., "Person spotting: video shot retrieval for face sets", In Proceedings of the 4th international conference on Image and Video Retrieval, Jul. 20, 2005, 10 pages.

Xu, et al., "Automatic Generated Recommendation for Movie Trailers", In IEEE International Symposium on Broadband Multimedia Systems and Broadcasting, Jun. 5, 2013, 6 pages.

Zhu, et al., "A Rank-Order Distance based Clustering Algorithm for Face Tagging", MSR's face SDK documentation: \\tkfiltoolbox\tools\facesdk\March 2014 Release\doc\html\master_facesdk.html, 8 pages.

Office Action for U.S. Appl. No, 14/445,463, dated Apr. 5, 2016, Suri et al., "Computerized Machine Learning of Interesting Video Sections", 25 pages.

The PCT Seach Report and Written Opinion dated Mar. 2, 2016 for PCT Application No. PCT/US2015/041869, 17 pages.

Office action for U.S. Appl. No. 14/445,463 dated Nov. 19, 2015, Suri et al., "Computerized Machine Learning of Interesting Video Sections", 20 pages.

The International Preliminary Report on Patentability dated Dec. 7, 2016 for PCT application No. PCT/US2015/041869, 11 pages.

Everingham, et al., "Taking the bite out of automated naming of characters in TV video" Image and Vision Computing 27 (2009), pp. 545-559.

Office action for U.S. Appl. No. 14/445,463, dated Aug. 22, 2016, Suri et al., "Computerized Machine Learning of Interesting Video Sections", 25 pages.

The PCT Written Opinion of the International Preliminary Examining Authority dated Sep. 12, 2016 for PCT application No. PCT/US2015/041869.

\* cited by examiner

COMPUTERIZED PROMINENT CHARACTER RECOGNITION IN VIDEOS

BACKGROUND

Video content consumers may wish to identify prominent persons, actors, and/or characters in the video content. Consuming video content, however, involves a significant time commitment. Unlike photos, which may be consumed instantly, a user may need to view an entire video before identifying important persons, actors, and/or characters. For example, if a user has a video collection that includes hundreds of video files, he or she may need to watch an entire length of a video file in the video collection to identify prominent persons, actors, and/or characters in the video file. Ultimately, the user may need to watch the entire video collection to identify which video files are associated with particular prominent persons, actors, and/or characters. Because such an identification process is time consuming, techniques have been developed to optimize video consumption.

Current techniques for identifying characters in video content involve face detection and grouping. However, many of the current techniques produce low quality results and/or are not accurate because of differences between image data and video content. In image data, persons, actors, and/or characters generally pose during the image data capture. Accordingly, the persons, actors, and/or characters are typically still (e.g., free of motion) and lighting conditions are uniform. However, in the context of video content, persons, actors, and/or characters generally do not pose and the quality of video content is less uniform than image data. For example, many times persons, actors, and/or characters are in motion and accordingly, may be facing away from the camera. In some situations, the persons, actors, and/or characters change facial expressions or may be partially occluded. Lighting conditions in video content vary such that recognizing persons, actors, and/or characters is more difficult than in image data. Accordingly, current techniques are insufficient for efficiently and effectively identifying important persons, actors, and/or characters in video data.

SUMMARY

This disclosure describes techniques for identifying prominent subjects in video content based on feature point extraction. Face recognition techniques in video files, including face detection and feature point detection and tracking, may be leveraged for optimizing subject recognition, grouping, and detecting important subjects in video files.

In at least one example, video files may be processed to detect faces associated with subjects in video frames of video files and extract feature points in the video frames. The extracted feature points may be used to infer faces on video frames where faces were not detected. In the at least one example, at least one feature point associated with a detected face in a first video frame may overlap with at least one feature point in a second video frame where a face was not detected. The detected face may be inferred in the second video frame based on the overlapping feature points.

Identified (e.g., detected or inferred) faces may be grouped based on similarities (e.g., faces of a same subject). The video frames associated with the identified (e.g., detected or inferred) faces may be arranged into groups. The extracted feature points may again be used for combining two or more groups of video frames to create a set of refined groups. In the at least one example, the combining may be based at least in part on the two or more groups including video frames having overlapping feature points associated with identified (e.g., detected or inferred) faces. Each of the refined groups may be associated with a subject in a video file. A frequency associated with each subject in the video file may be determined by counting a number of video frames including the individual subject and dividing the number by a total number of video frames in the video file. A prominence score associated with the subject may be determined based at least in part on a size value associated with the subject, a position value associated with the subject, and the frequency associated with the subject.

Leveraging the techniques described herein may enable video consumers to consume video content in a more efficient and effective manner. For example, the prominence score determined for individual subjects may be leveraged for ranking subjects in a video file based on the prominence scores. The prominence score may be leveraged for filtering video files in a video collection pursuant to a user request. The filtered video files may then be ranked based on the prominence score associated with a user specified subject in each of the filtered video files. Additionally, the techniques described herein may be used to otherwise optimize video playback, sharing, and/or editing.

This Summary is provided to introduce a selection of concepts in a simplified form that are further described below in the Detailed Description. This Summary is not intended to identify key or essential features of the claimed subject matter, nor is it intended to be used to limit the scope of the claimed subject matter.

BRIEF DESCRIPTION OF THE DRAWINGS

The Detailed Description is set forth with reference to the accompanying figures, in which the left-most digit of a reference number identifies the figure in which the reference number first appears. The use of the same reference numbers in the same or different figures indicates similar or identical items or features.

DETAILED DESCRIPTION

Figure 1:
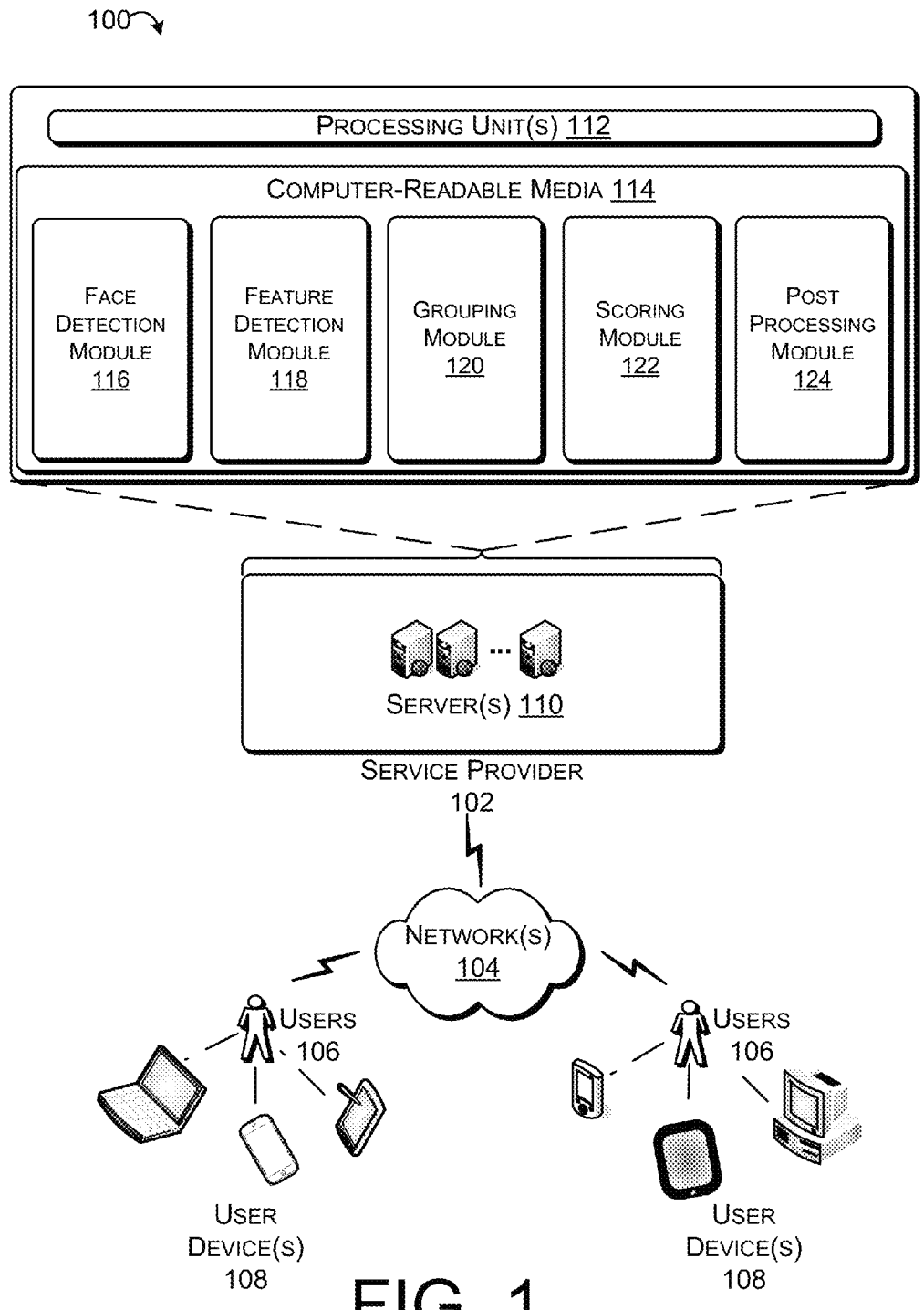
FIG. 1 is a diagram showing an example system for identifying prominent subjects in video content based on feature point extraction.

This disclosure describes techniques for identifying prominent subjects in video content based on feature point extraction. Generally, subjects of video content don't pose while the video content is being captured and subjects in video content are often in motion. This results in subjects facing away from the camera or having different orientations that are difficult for computer-vision algorithms to detect. Similarly, because of this motion, video content often includes motion blur, inconsistent lighting, and/or partial occlusion. Techniques described herein leverage face recognition techniques in video files, including face detection and feature point detection and tracking, to optimize subject recognition, face grouping, and prominent subject identification in video files.

In at least one example, a service provider may process video files to detect faces associated with subjects in video frames of video files and extract feature points in the video frames. The service provider may use the extracted feature points to infer faces on video frames where faces were not detected. The service provider may arrange identified faces (e.g., detected and inferred) and associated video frames into groups and may combine two or more groups to create a set of refined groups based on the extracted feature points. In the at least one example, the service provider may combine the two or more groups including video frames based at least in part on the two or more groups having video frames with at least one overlapping feature point associated with an identified face. Each of the refined groups may be associated with a subject and the service provider may determine a frequency associated with the subject in the video file by counting a number of video frames including the subject and dividing the number of video frames including the subject by a total number of video frames in a video file. The service provider may determine a prominence score associated with the subject based at least in part on a size value associated with the subject, a position value associated with the subject, the frequency associated with the subject, and other properties associated with the presentation of the subject (e.g., whether the subject appears sharp or blurry).

As described herein, subjects may include persons, actors, and/or characters. A prominent subject may represent a most important person, actor, and/or character. Prominence is based at least in part on a frequency of appearance of the subject, an area occupied by the subject on a video frame, and a position of the subject on a video frame.

Video content may include video frames, video segments, video files, and/or video collections. Video frames represent individual still images extracted from a moving picture. Video segments represent a set of video frames. In at least one example, a video segment may be defined as a fixed number of video frames (e.g., 20 video frames, 50 video frames, etc.). In other examples, a video segment may be defined by a time period (e.g., two seconds, five seconds, etc.). Video files represent a set of video segments. In at least one example, a video file represents an individual scene, or series of connected shots, that may be associated with a particular location, time, and/or person. A shot is a part of a video file that may be captured from a single camera perspective. Video collections are compilations of video files collected over a period of time. The video files in the video collections may represent different categories, events, locations, characters, scenes, etc. Video files in the video collections may be related by category, event, location (e.g., geo-stamp), character, scene, and/or time frame (e.g., time-stamp).

The techniques described herein optimize user consumption of video content. For example, the prominence score associated with the subjects in the video files may be leveraged for ranking the subjects in the video file based on the determined prominence score. The prominence score may be leveraged for filtering video files in a video collection pursuant to a user request for a specific subject. The filtered video files may be ranked based on the prominence score associated with the specific subject in each of the filtered video files. Additionally, the techniques described herein may be used to otherwise optimize video viewing, sharing, and/or editing.

Examples described herein provide techniques for identifying prominent subjects in video content based on feature point extraction. In various instances, a processing unit configured via programming from modules or APIs to perform techniques as described herein can include one or more of a central processing unit (CPU), a graphics processing unit (GPU), a field-programmable gate array (FPGA), another class of digital signal processor (DSP), or other hardware logic components that may, in some instances, be driven by the CPU. For example, and without limitation, illustrative types of hardware logic components that can be used include Application-Specific Integrated Circuits (ASICs), Application-Specific Standard Products (ASSPs), System-on-a-chip systems (SOCs), Complex Programmable Logic Devices (CPLDs), etc.

Illustrative Environment

The environment described below constitutes but one example and is not intended to limit application of the system described below to any one particular operating environment. Other environments may be used without departing from the spirit and scope of the claimed subject matter. The various types of processing described herein may be implemented in any number of environments including, but not limited to, stand along computing systems, network environments (e.g., local area networks or wide area networks), peer-to-peer network environments, distributed-computing (e.g., cloud-computing) environments, etc.

FIG. 1 is a diagram showing an example system 100 for identifying prominent subjects in video content based on feature point extraction. More particularly, the example system 100 may include a service provider 102, one or more network(s) 104, one or more users 106, and one or more user devices 108 associated with the one or more users 106. Alternatively, or in addition, the functionality described herein can be performed, at least in part, by one or more hardware logic components such as accelerators. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. For example, an accelerator can represent a hybrid device, such as one from ZYLEX or ALTERA that includes a CPU course embedded in an FPGA fabric.

As shown, the service provider 102 may include one or more server(s) 110, which may include one or more processing unit(s) 112 and computer-readable media 114. In various examples, the service provider 102 may extract feature points associated with detected faces for identifying prominent subjects in video content based on the feature point extraction. In some examples service provider 102 may receive video content. The service provider 102 may detect faces in the video content and may extract feature points in video frames of the video content. In at least one example, the detected faces may be associated with at least one extracted feature point The service provider 102 may leverage the feature points for inferring faces on video frames where faces were not originally detected and/or for optimizing face grouping to identify prominent subjects in the video content.

In some examples, the network(s) 104 may be any type of network known in the art, such as the Internet. Moreover, the user devices 108 may communicatively couple to the network(s) 104 in any manner, such as by a global or local wired or wireless connection (e.g., local area network (LAN), intranet, etc.). The network(s) 104 may facilitate communication between the server(s) 110 and the user devices 108 associated with the users 106.

The users 106 may operate corresponding user devices 108 to perform various functions associated with the user devices 108, which may include one or more processing unit(s), computer-readable storage media, and a display. Furthermore, the users 106 may utilize the user devices 108 to communicate with other users 106 via the one or more network(s) 104.

User device(s) 108 can represent a diverse variety of device types and are not limited to any particular type of device. Examples of user device(s) 108 can include but are not limited to stationary computers, mobile computers, embedded computers, or combinations thereof. Example stationary computers can include desktop computers, work stations, personal computers, thin clients, terminals, game consoles, personal video recorders (PVRs), set-top boxes, or the like. Example mobile computers can include laptop computers, tablet computers, wearable computers, implanted computing devices, telecommunication devices, automotive computers, personal data assistants (PDAs), portable gaming devices, media players, cameras, or the like. Example embedded computers can include network enabled televisions, integrated components for inclusion in a computing device, appliances, microcontrollers, digital signal processors, or any other sort of processing device, or the like.

The service provider 102 may be any entity, server(s), platform, etc., that may extract feature points associated with recognized faces for identifying prominent subjects in video content based on the feature point extraction. Moreover, and as shown, the service provider 102 may include one or more server(s) 110, which may include one or more processing unit(s) 112 and computer-readable media 114 such as memory. The one or more server(s) 110 may include devices.

Examples support scenarios where device(s) that may be included in the one or more server(s) 110 can include one or more computing devices that operate in a cluster or other clustered configuration to share resources, balance load, increase performance, provide fail-over support or redundancy, or for other purposes. In at least one example, the techniques described herein may be performed remotely (e.g., by a server, cloud, etc.). In some examples, the techniques described herein may be performed locally on a user device. For example, user device(s) 108 may receive video content. The user device(s) 108 may detect faces in the video content and may extract feature points in video frames of the video content. In at least one example, the detected faces may be associated with at least one extracted feature point. The user device(s) 108 may leverage the feature points for inferring faces on video frames where faces were not originally detected and/or for optimizing face grouping to identify prominent subjects in the video content. Additionally, in some examples techniques described herein may be performed remotely and locally. For example, some of the techniques (e.g., face detection, feature detection, grouping, etc.) may be performed remotely by a server 110 and processed results may be stored in a cloud. Additionally, post-processing (e.g., ranking, filtering, segmenting, etc.) may be performed on a user device 108.

Device(s) included in the one or more server(s) 110 can represent, but are not limited to, desktop computers, server computers, web-server computers, personal computers, mobile computers, laptop computers, tablet computers, wearable computers, implanted computing devices, telecommunication devices, automotive computers, network enabled televisions, thin clients, terminals, personal data assistants (PDAs), game consoles, gaming devices, work stations, media players, personal video recorders (PVRs), set-top boxes, cameras, integrated components for inclusion in a computing device, appliances, or any other sort of computing device.

Device(s) that may be included in the one or more server(s) 110 can include any type of computing device having one or more processing unit(s) 112 operably connected to computer-readable media 114 such as via a bus, which in some instances can include one or more of a system bus, a data bus, an address bus, a PCI bus, a Mini-PCI bus, and any variety of local, peripheral, and/or independent buses. Executable instructions stored on computer-readable media 114 can include, for example, a face detection module 116, a feature detection module 118, a grouping module 120, a scoring module 122, a post-processing module 124, and other modules, programs, or applications that are loadable and executable by processing units(s) 112. Alternatively, or in addition, the functionality described herein can be performed, at least in part, by one or more hardware logic components such as accelerators. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. For example, an accelerator can represent a hybrid device, such as one from ZyXEL® or Altera® that includes a CPU course embedded in an FPGA fabric.

Device(s) that may be included in the one or more server(s) 110 can further include one or more input/output (I/O) interface(s) coupled to the bus to allow device(s) to communicate with other devices such as user input peripheral devices (e.g., a keyboard, a mouse, a pen, a game controller, a voice input device, a touch input device, gestural input device, and the like) and/or output peripheral devices (e.g., a display, a printer, audio speakers, a haptic output, and the like). Devices that may be included in the one or more server(s) 110 can also include one or more network interfaces coupled to the bus to enable communications between computing device and other networked devices such as user device(s) 108. Such network interface(s) can include one or more network interface controllers (NICs) or other types of transceiver devices to send and receive communications over a network. For simplicity, some components are omitted from the illustrated system.

Processing unit(s) 112 can represent, for example, a CPU-type processing unit, a GPU-type processing unit, a field-programmable gate array (FPGA), another class of digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-chip systems (SOCs), Complex Programmable Logic Devices (CPLDs), etc. In various examples, the processing unit(s) 112 may execute one or more modules and/or processes to cause the server(s) 110 to perform a variety of functions, as set forth above and explained in further detail in the following disclosure. Additionally, each of the processing unit(s) 112 may possess its own local memory, which also may store program modules, program data, and/or one or more operating systems.

In at least one configuration, the computer-readable media 114 of the server(s) 110 may include components that facilitate interaction between the service provider 102 and the users 106. For example, the computer-readable media 114 may include a face detection module 116, a feature detection module 118, a grouping module 120, a scoring module 122, and a post-processing module 124. The modules (116, 118, 120, 122, and 124) can be implemented as computer-readable instructions, various data structures, and so forth via at least one processing unit(s) 112 to configure a device to execute instructions and to perform operations implementing extracting feature points associated with recognized faces for identifying prominent subjects in video content based on the feature point extraction. Functionality to perform these operations may be included in multiple devices or a single device.

Depending on the configuration and type of the server(s) 110, the computer-readable media 114 may include computer storage media and/or communication media. Computer storage media can include volatile memory, nonvolatile memory, and/or other persistent and/or auxiliary computer storage media, removable and non-removable computer storage media implemented in any method or technology for storage of information such as computer readable instructions, data structures, program modules, or other data. Computer memory is an example of computer storage media. Thus, computer storage media includes tangible and/or physical forms of media included in a device and/or hardware component that is part of a device or external to a device, including but not limited to random-access memory (RAM), static random-access memory (SRAM), dynamic random-access memory (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, miniature hard drives, memory cards, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast, communication media may embody computer readable instructions, data structures, program modules, or other data in a modulated data signal, such as a carrier wave, or other transmission mechanism. The term "modulated data signal" means a signal that has one or more of its characteristics set or changed in such a manner as to encode information in the signal. Such signals or carrier waves, etc. can be propagated on wired media such as a wired network or direct-wired connection, and/or wireless media such as acoustic, RF, infrared and other wireless media. As defined herein, computer storage media does not include communication media. That is, computer storage media does not include communications media consisting solely of a modulated data signal, a carrier wave, or a propagated signal, per se.

Figure 2:
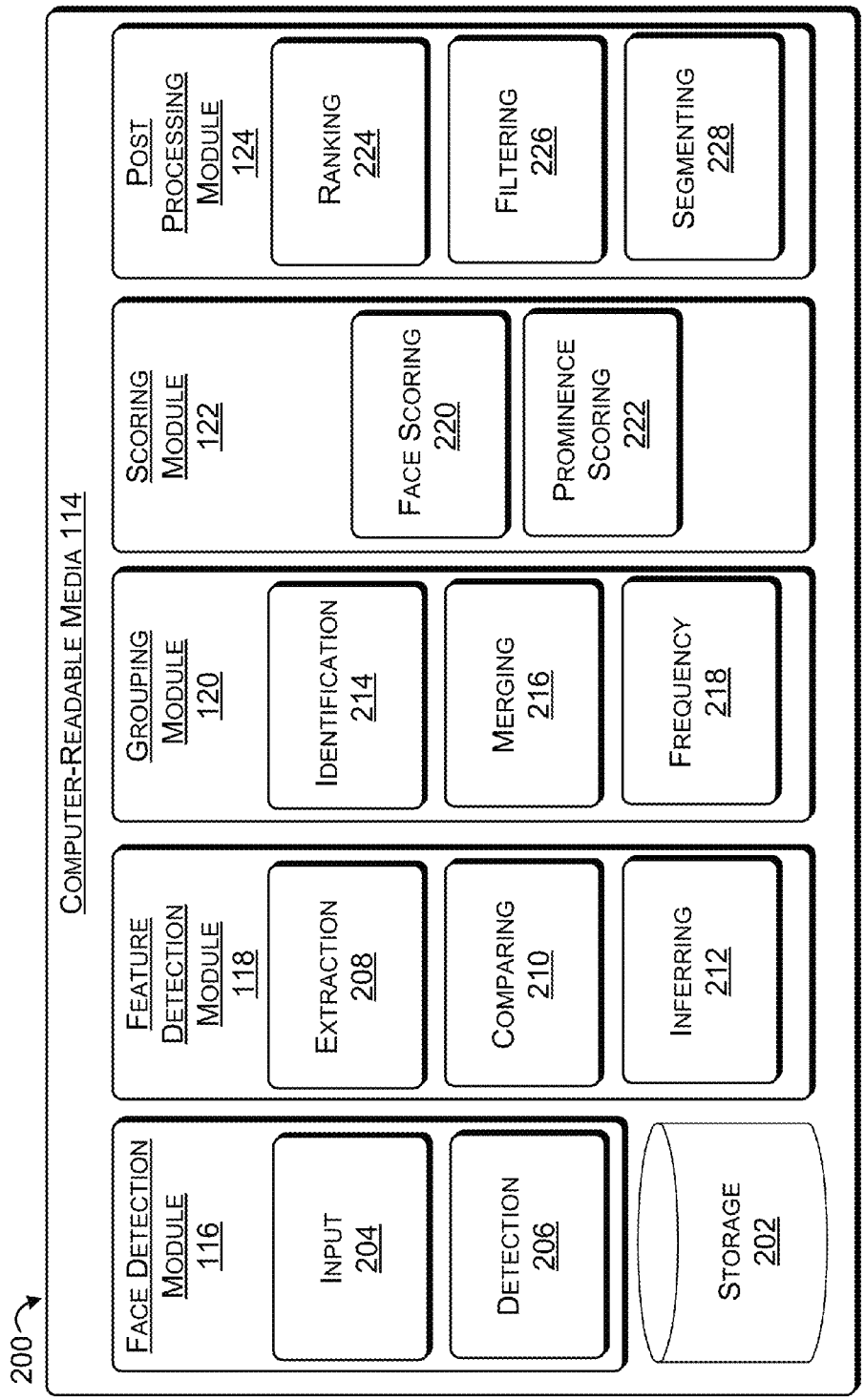
FIG. 2 is a diagram showing additional components of the example system for identifying prominent subjects in video content based on feature point extraction.

FIG. 2 is a diagram showing additional components of the example system 200 for identifying prominent subjects in video content based on feature point extraction. As shown in FIGS. 1 and 2, the system 200 may include the face detection module 116, the feature detection module 118, the grouping module 120, the scoring module 122, and the post-processing module 124. The system 200 may also include a storage module 202.

The face detection module 116 may process video frames associated with individual video files to detect positions of faces that appear in the video frames. The face detection module 116 may include a receiving module 204 and a detection module 206. In at least one example, the receiving module 204 receives video content. A user 106 may input the video content from his or her user device 108, or the video content may be received from another source (e.g., the internet, etc.). The video content may include one or more video files and each of the video files comprises video segments and video frames as described above. In some examples, every video frame may have one or more faces that are captured on the video frame. In other examples, some video frames may not have any faces that are captured on the video frame. The input module 204 may decode the video frames prior to outputting the video frames to the detection module 206.

The detection module 206 may process the video frames to detect one or more faces in the video frames. In at least one implementation, the detection module 206 may represent one or more face detectors (e.g., Haar feature detectors, LBP feature detectors, etc.) configured for identifying possible faces in the video frames. The one or more face detectors may include frontal-view detectors (such as Haar feature detectors) or multi-view detectors (such as LBP feature detectors). In at least one example, the detection module 206 may include an algorithm consistent with the following pseudocode:

```
shared_ptr<IFaceRepresentationExtractor>
    faceRepresentationExtractor
(
    FaceRepresentationExtractorFactory::
    Create(FaceRepresentationType::
    ShapeIndex)
)
```

In some examples, the detection module 206 may detect faces in every video frame of a video file. However, in other examples, the detection module 206 may detect faces in some video frames of the video file. In such examples, there may be some video frames of the video file where the detection module 206 does not detect any faces even though subjects appear in the video frames.

Figure 3:
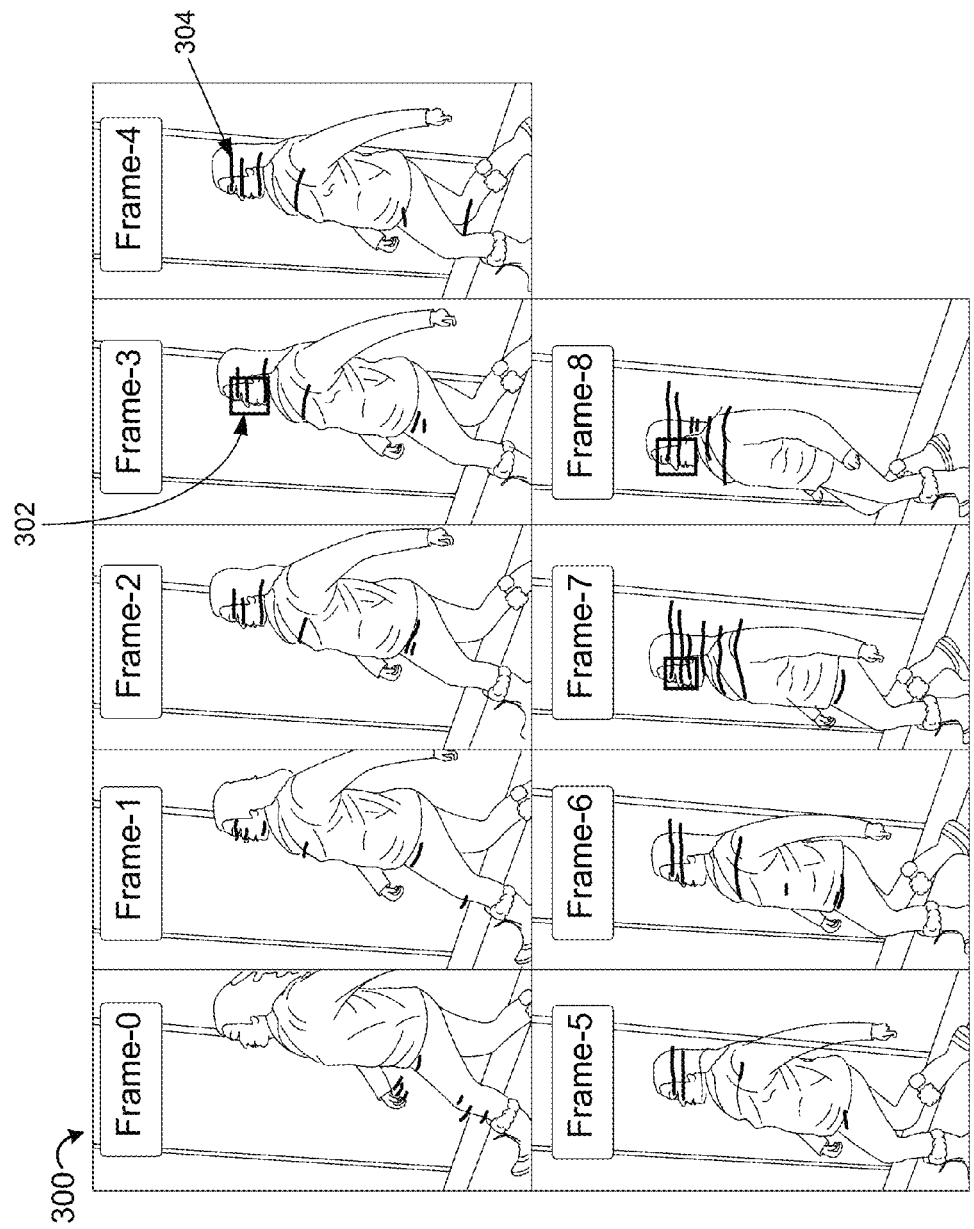
FIG. 3 illustrates a set of consecutive video frames on which face detection and feature point extraction have been performed.

FIG. 3 illustrates a set of consecutive video frames on which face detection and feature point extraction have been performed. In FIG. 3, for example, detection module 206 detected a face in Frame 3, Frame 7, and Frame 8, as shown by square 302. However, in FIG. 3, detection module 206 did not detect a face in Frame 0, Frame 1, Frame 2, Frame 4, Frame 5, or Frame 6, as shown by the absence of square 302 in those frames.

For each video frame in which the detection module 206 detects one or more faces, the detection module 206 may output a list of rectangles for an analyzed video frame, where each rectangle represents a face detected on the video frame. Additionally, each of the detected faces may include a set of face details such as a flat index, position, and size. Position may represent a position of the detected face spatially within a video frame. Size may represent an area occupied by a detected face. The face details may also include face landmarks associated with each of the detected faces. The face landmarks represent interest points or significant facial landmarks on the detected faces. Each detected face may have a set (e.g., 27 or n number of real (float) values) of representative face landmarks that are used for recognizing and/or grouping faces. In some examples, storage module 202 may store face details or the storage module 202 may cause such details to be stored in a service (e.g., Microsoft OneDrive®, DropBox®, Google® Drive, etc.).

Returning to FIG. 2, the feature detection module 118 processes the video frames to identify feature points associated with faces detected on the video frames and to track the feature points throughout the video file. The feature detection module 118 may include an extraction module 208, a comparing module 210, and an inferring module 212. The extraction module 208 may process the video frames to extract the feature points. Feature points may represent interest points detected on the video frames. Interest points are points in an image that may be reliably located across multiple views by an interest point detector algorithm. The feature points may be used to infer faces on video frames where faces are not detected and for merging groups as discussed below.

In at least one example, the extraction module 208 may extract the feature points in the video frames based on a software library that provides feature detection and matching functionality. In various examples, extraction module 208 may extract feature points using code that detects points that may lie on corners or in a middle of blob-like regions. The extraction module 208 may also take into account translation, rotation, scaling, and affine deformation in extracting feature points. In at least one example, the extraction module 208 may consider brightness and contrast variations. In some examples, the extraction module may detect feature points on a sub-pixel level to facilitate matching over a range of viewing distances and improving reconstruction of 3D geometry. The extraction module 208 may include a FAST detector based on a FAST algorithm configured to detect corners by looking at all the pixels around the center pixel in a circle with a fixed radius and compares grey values to a central grey value, a Laplacian interest point detector configured to detect light or dark blob-like regions in a video frame, a Harris detector configured to detect corners in an image, or a MSER detector configured to find regions of pixels which are stable against image value thresholding.

Some of the feature points may be associated with the faces detected by the detection module 206. In other examples, the extraction module 208 may extract feature points from a video frame but the feature points may not be associated with any detected faces on the video frame. In various examples, the detection module 206 can infer a face, for example using a video frame-feature matching technique applied to one or more feature points inside a detected face area of an anchor video frame, when same or overlapping feature points are also found in other video frames.

Returning to FIG. 3, FIG. 3 illustrates one example of a set of video frames including identified feature points 304 and the movement of the identified feature points 304 over time. The short lines illustrated in FIG. 3 represent positions of the feature points 304 and their movement over time. By following the movement of the feature points 304, the extraction module 208 may track the feature points 304 from video frame to video frame.

Each of the feature points may have a set of feature point values, which can be applied to identify relationships between feature points in some faces, video frames, etc. The feature point values may include a position, group identification, a pointer to a particular feature point in a preceding video frame, a pointer to a particular feature point in a succeeding video frame, and/or face identification. The extraction module 208 may output the set of feature point values to the storage module 202.

Returning back to FIG. 2, the comparing module 210 may compare feature points extracted on the video frames in the video file. In at least one example, the comparing module 210 may compare a video frame including a detected face and corresponding feature points with other video frames in the video file. The video frame including a detected face and having one or more feature points associated with the detected face may be called an anchor video frame. The other video frames in the video file may precede the anchor video frame or succeed the anchor video frame. The other video frames may be adjacent to the anchor video frame or may be two or more video frames away from the anchor video frame. The detection module 206 may or may not have detected faces in the other video frames. In at least one implementation, the feature points in some of the other video frames may be the same as the feature points in the anchor video frame, and yet, the detection module 206 may not have detected a face associated with the feature points in the other video frames.

Figure 4:
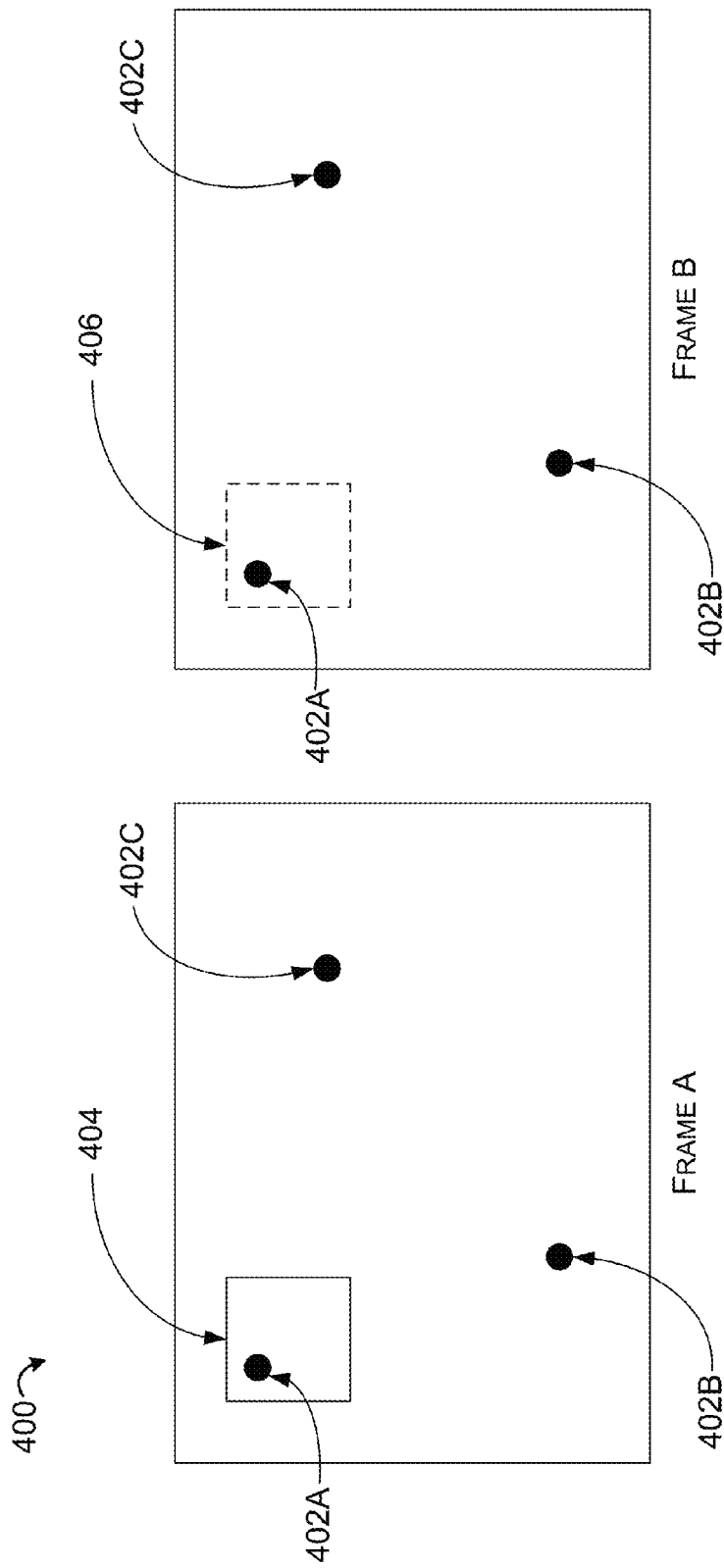
FIG. 4 illustrates a pair of video frames on which face detection and feature point extraction have been performed.

In FIG. 3, Frame 3 illustrates an anchor video frame including both a detected face (as shown by square 302) and corresponding feature points 304. In FIG. 4, which illustrates a pair of video frames on which face detection and feature point extraction have been performed, Frame A represents an example of an anchor video frame including three feature points (402A, 402B, and 402C). Feature point 402A is associated with a detected face as shown by square 404. The comparing module 210 may compare the anchor video frame (e.g., Frame 3 in FIG. 3 or Frame A in FIG. 4) with video frames that precede the anchor video frame and/or video frames that succeed the anchor video frame to identify whether the preceding and/or succeeding video frames have any of the same feature points as the feature points associated with the detected face in the anchor video frame. In at least some examples, one or more of the preceding and/or succeeding video frames do not include detected faces. For example, in FIG. 4, as indicated by a lack of a square 404, Frame B does not have a detected face. Frame B does, however, have the same three feature points (402A, 402B, and 402C) as Frame A. Accordingly, in the example illustrated in FIG. 4, Frame A and Frame B have feature points 402A-C that overlap. Feature points may overlap if two or more feature points are in a same location and/or are within a predetermined threshold distance from one another.

Returning back to FIG. 2, the inferring module 212 infers faces in video frames where faces were not originally detected by the detection module 206. The inferring module 212 uses output from the comparing module 210 to infer the faces. For example, the feature points extracted from the anchor frame may comprise one or more feature points associated with a detected face on the anchor frame. The comparing module 210 may identify one or more feature points in a preceding and/or succeeding video frame. In at least one implementation, the detection module 206 did not detect a face in the preceding and/or succeeding video frame. In the at least one implementation, one or more of the feature points in the preceding and/or succeeding video frame are the same as one or more of the feature points in the anchor video frame. If the one or more feature points in the preceding and/or succeeding video frames are the same as the one or more feature point associated with the detected face on the anchor frame, the inferring module 212 may infer the detected face in the preceding and/or succeeding video frame.

For example, in FIG. 4, the inferring module 212 may infer that the detected face associated with the square 404 and feature point 402A is also in Frame B as shown by the dotted square 406, even though the detection module 206 did not detect a face in Frame B. In FIG. 4, feature points 402A-C on Frame A may represent feature points extracted from Frame A. Feature points 402A-C on Frame B may represent feature points extracted from Frame B. As discussed above, feature point 402A is associated with detected face 404 on Frame A. Feature point 402A in Frame A overlaps with feature point 402A in Frame B. Accordingly, the inferring module 212 may infer that the face associated with square 404 is also present in Frame B, and may thus indicate such face was identified in Frame B (square 406). Two of the overlapping feature points 402B and 402C are not associated with detected faces in either Frame A or Frame B. Accordingly, even though 402B and 402C overlap in Frame A and Frame B, the inferring module 212 may not infer any additional faces because neither feature point 402B or 402C is associated with a detected face. In FIG. 4, all of the feature points in Frame A and all of the feature points in Frame B overlap. However, all of the feature points in the video frames do not need to overlap. In at least some examples, only some of the feature points may overlap and, so long as at least one overlapping feature point is associated with a detected face on at least one of the video frames, the inferring module 212 may infer a face in a video frame having an overlapping feature point despite the video frame not having a detected face.

In at least some examples, the inferring module 212 may infer a face on a preceding and/or succeeding video frame if the feature points associated with the detected face on the anchor video frame are not in the same spot, but have moved a distance below a predetermined threshold. In such examples, the inferring module 212 determines the spatial movement of the extracted feature points between neighboring frames. For example, if a feature point or set of feature points associated with a detected face is at a particular location (0, 0) and moves to another location (500, 500) in an immediately subsequent frame, the inferring module 212 is not likely to infer a face in the subsequent frame. In such an example, a detected face is not likely to move such a significant distance spatially in the time that passes from video frame to video frame, unless the detected face was too close to the camera such to skew the results. Accordingly, such movement would be above the predetermined threshold and therefore, the inferring module 212 may not infer a face in the immediately subsequent frame.

Returning to FIG. 2, the grouping module 120 may use the face landmarks associated with the identified faces to group together faces having similar face landmarks. The identified faces may be the faces detected in the detection module 206 and/or the faces inferred by the inferring module 212. The grouping module may include an identification module 214, a merging module 216, and a frequency module 218. In at least one example, the identification module 124 may process the face landmarks associated with the identified faces and identify a set of identified faces as representing similar faces. Then the identification module 124 may arrange the set of identified faces into a number of groups.

In at least one example, each of the groups represents an identified face associated with a different subject. In at least one example, the grouping module 120 may group identified faces together based at least in part on defining asymmetric distances between the identified faces to generate rank-ordered lists associated with the identified faces. The grouping module 120 may determine an image rank order distance for pairs of identified faces by normalizing the asymmetric distances of corresponding identified faces. The grouping module 120 may use the rank order distances for grouping the identified faces. In additional examples, the grouping module 120 may group identified faces together based on similarity (e.g., face similarities, torso feature similarities, etc.). In some examples, the grouping module 120 may group identified faces together based on other algorithms or criteria (e.g., K-means, spectral clustering, Shared Nearest Neighbor, etc.). In at least one example, the identification module 214 may output a list of subjects associated with the individual faces based on the face identifications and a corresponding list of video frames associated with each subject in the list of subjects Table 1, as shown below, is an example of output from the identification module 214.

TABLE 1

| Subject | Video Frames |
| --- | --- |
| A | 1, 2, 5, 6, 7, 8, 22, 24, 26, 27, 28, 29, 30 |
| B | 2, 3, 4, 15, 16, 17, 18, 22, 24, 30, 31, 32, 33, 34 |
| C | 9, 10, 11, 12, 13, 14, 19, 20, 21, 23, 25 |

As shown in Table 1, the identification module 214 may identify three different subjects, Subject A, Subject B, and Subject C. Subject A, Subject B, and Subject C each correspond to a group. In this example, Subject A was identified in video frames 1, 2, 5, 6, 7, 8, 22, 24, 26, 27, 28, 29, and 30. Meanwhile, in this example, Subject B was identified in video frames 2, 3, 4, 15, 16, 17, 18, 22, 24, 30, 31, 32, 33, and 34. And, in this example, Subject C was identified in video frames 9, 10, 11, 12, 13, 14, 19, 20, 21, 23, and 25. For each video frame in a group, the identification module 214 may include face details for the detected face associated with the group and/or an indication that the face in the frame was an inferred face based on processing in the inferring module 212.

The merging module 216 may compare feature points associated with individual video frames in each of the groups and, if any feature points associated with identified faces overlap with any feature points associated with identified faces in any of the video frames in any of the groups, the merging module 216 may merge two or more groups with frames having overlapping feature points associated with detected faces into a single group associated with a particular subject. The resulting groups may be considered refined groups. Each of the refined groups may include a set of video frames associated with a particular subject, such that the particular subject has been identified in each of the video frames in the refined group.

The frequency module 218 may determine frequency data representing the frequency of each of the faces identified after processing in the merging module 216. The frequency may be determined by calculating a number of video frames on which an identified face associated with a particular subject appears and dividing that number by the total number of video frames in a video file. In at least one example, the number of video frames on which an identified face associated with a particular subject appears may be the same as the total number of video frames that belong to a refined group associated with the particular subject after processing in the merging module 216. In some examples, storage module 202 may store frequency data or the storage module 202 may cause such data to be stored in a service (e.g., Microsoft OneDrive®, DropBox®, Google® Drive, etc.).

In some examples, identified subjects where the frequencies are determined to be higher than other identified subjects are more prominent than the identified subjects having lower frequencies. For example, if a first identified subject appears in more video frames of a video file than a second identified subject, the first identified subject is more prominent than the second identified subject. The frequency module 218 may determine identified subjects having frequencies above a predetermined threshold to be more prominent than identified subjects having frequencies below a predetermined threshold.

The scoring module 122 may calculate a prominence score associated with each of the identified faces based on frequency, a size, and a position of each of the identified faces in the video content. The prominence score may also be determined based on properties associated with the presentation of the identified faces (e.g., whether the identified faces appear sharp or blurry). In at least one example, two or more subjects may have a same frequency. However, in the at least one example, one of the subjects may be more prominent than the others, even though they share the same frequency. The scoring module 122 may include a face scoring module 220 and a prominence scoring module 222.

The face scoring module 220 may consider face details associated with the identified faces to determine a face score for each of the subjects identified in the video file. The face scoring module 220 may receive face details from the storage module 202 or a service. In at least one example, the face details include a size and a position of an identified face.

The size of an identified face may be represented by a size value associated with a normalized-area calculated for an identified face. In at least one example, the size value may be linear when the size of the face is between two thresholds. A first threshold defines a small face area and a second threshold defines a large face area. However faces that are very small or faces that are very large both receive low size values (e.g., close to zero) because such very small and/or very large faces may be captured unintentionally due to a person being too close or too far away from the camera. For example, a user may be recording their child playing in a playground and another child may run in front of the camera. The face of the child who ran in front of the camera may appear very large in size on the camera and accordingly, may receive a low size value (e.g., close to zero).

The position of an identified face describes a spatial position of the identified face on the video frame. The position may be associated with a position value that indicates a proximity of an identified face to the center of the video frame. In at least one example, identified faces that are closer to the center of a frame receive a higher value (e.g., closer to one) than identified faces that are near the top, bottom, left edge, or right edge of the video frame. In at least one example, identified faces closest in proximity to the horizontal center of the video frame receive a highest proximity value (e.g., nearly one).

The prominence scoring module 222 may combine the face score with the frequency data to calculate a prominence score for a subject that is identified in a video file. The prominence scoring module 222 may obtain the frequency data from the storage module 202 or a service.

The post processing module 124 may receive video files wherein each of the subjects identified in a video file are associated with prominence scores. The post processing module 124 may rank, filter, segment, or otherwise process the scored video files. The post processing module 124 may include a ranking module 224, a filtering module 226, a segmenting module 228, and other modules for post processing.

The ranking module 224 may compare the prominence scores determined for each of the individual subjects in the video file and may rank the subjects based on the prominence scores. Accordingly, a subject who occupies a relatively large area on a video frame, near the horizontal center of the video frame, and regularly appears in the video file (e.g., has a frequency above a predetermined threshold) may be ranked above a subject who occupies a relatively small area on a video frame, away from the horizontal center of the video frame, and/or who appears in fewer frames of the video file. The ranking module 224 enables users to easily identify the most prominent subjects in video files.

The filtering module 226 may filter video files in a video collection. In one example, the filtering module 226 may use metadata or tags to associate identified subjects associated with subjects in the video files with particular subjects (e.g., name of identified subject) and/or to determine relationships (e.g., husband/wife, brother/sister, friend, etc.) between an owner of the video collection and the particular subjects. In other examples, the face landmarks may be used to identify the particular subjects by comparing face landmarks associated with the particular subjects in other video files. The filtering module 226 may receive user input indicating that the user would like to access video files related to a particular subject. The user may request a particular name of a subject (e.g., Nick, Sally, etc.) and/or a relationship (e.g., daughter, wife, etc.). In response to the user input, the filtering module 226 may filter through the video files of a video collection and identify video files that include the requested subject. In some examples, the filtering module 226 and the ranking module 224 may collaborate and produce a filtered list of video files including the requested subject and may rank the videos based on the prominence score associated with the requested individual in each of the video files.

The segmenting module 228 may locate precise boundaries for general areas associated with identified subjects having prominence scores above a predetermined threshold in the video file. In at least one example, the segmenting module 228 may consider camera motion boundaries to precisely identify boundaries associated with the general areas having identified subjects having prominence scores above a predetermined threshold. Camera motion boundaries may consider the movement of a camera in a static scene. In the at least one example, video frames including identified subjects having prominence scores above a predetermined threshold, may be analyzed for camera motions such as panning in one direction (e.g., pan left, pan right, panning to a top of a scene, panning to a bottom of a screen, etc.) and/or zooming (e.g., zoom in, zoom out). A boundary may be defined when the camera motion changes.

For example, a video file may include several video segments of a cat looking out a window. The cat may be fairly static but the camera may be panning left to identify the cat in the window and center the cat on the screen. The camera user may want to show that the cat is looking at a bird outside the window and accordingly, after panning to locate the cat in the middle of the screen, may zoom in towards the cat. Then, the camera user may zoom out to focus on the cat in the window again. Each of the motions described above (e.g., panning left, zooming in, zooming out) may be used to identify different video segments of the video file based on the camera movement.

The segmenting module 228 may determine camera motion boundaries of an object between video frames of a video file. The segmenting module 228 may identify changes in motion intensities between video frames where the changes are above a predetermined threshold. For instance, the segmenting module 228 may identify a boundary when a first video frame includes nearly no object motion intensity (object motion intensity below a predetermined threshold) and a neighboring video frame includes high object motion intensity (object motion intensity above a predetermined threshold). Additionally, the segmenting module 228 may identify a boundary when a first video frame includes high object motion intensity (object motion intensity above a predetermined threshold) and a neighboring video frame includes nearly no object motion intensity (object motion intensity below a predetermined threshold).

For example, if a camera is capturing a cat playing with a yarn ball, the cat may be holding the yarn ball and consequently there may be nearly no object motion intensity (object motion intensity below a predetermined threshold) in the video frames associated with such action. The set of video frames (e.g., video segment) associated with the cat throwing the yarn ball in the air may each display high object motion intensity (object motion intensity above a predetermined threshold). In the video frame following the last video frame associated with the cat throwing the yarn ball, the cat may be holding the ball of yarn again and thus, the video frame may have nearly no object motion intensity (object motion intensity below a predetermined threshold). Accordingly, the segmenting module 228 may identify three separate video segments, wherein the boundaries may be precisely defined by changes in the object motion intensities reflective of the cat throwing the ball of yarn in the air.

In addition to the ranking, filtering, and segmenting, the post processing module 124 may process the scored video files in other ways. For example, the post processing module may leverage the scored video files to automatically create a new video file that includes subjects who have prominence scores above a predetermined threshold. The post processing module 124 may create the new video files based on identifying video segments that include a subject having an importance score above a predetermined threshold. The post processing module 124 may extract the identified video segments and may add transitions between the video segments such to create a new video file. The post processing module 124 may use the prominence scores to create movie posters and/or title pages that display the subjects having a prominence score above a predetermined threshold.

The post processing module 124 may also tag video files to identify temporal locations of where each of the identified subjects appear in the video file. The tagging may also include how long an identified subject appears. Based on this information, a user may easily jump to a particular location associated with an identified subject in a video file directly. In at least one example, the user may be presented with a user interface that displays thumbnails representing the identified subjects in a video file. Accordingly, a user may select one of the thumbnails and may be directed to the particular location associated with the identified subjects depicted in the selected thumbnail.

The post processing module 124 may also identify a best shot for each subject based on face scores calculated in the face scoring module 220. The best shot may be identified by the highest face score for a video frame in the group of video frames associated with a particular identified subject.

Example Processes

Figure 5:
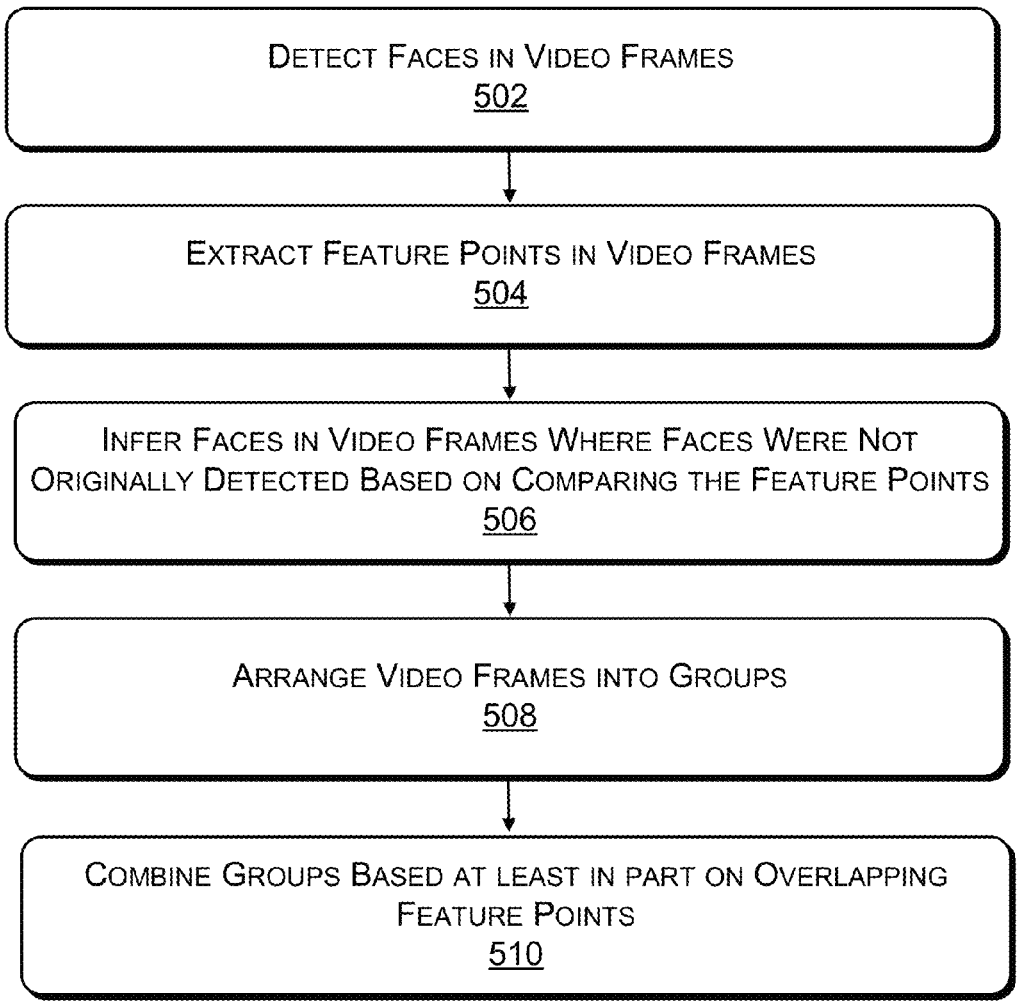
FIG. 5 illustrates a process for inferring faces in video frames and combining video frames based on feature point extraction.

FIG. 5 illustrates a process 500 for inferring faces in video frames and combining video frames based on feature point extraction.

Block 502 illustrates detecting faces in video frames. The detection module 206 may process the video frames to detect one or more faces in the video frames. In at least one implementation, a feature detector with multi-view support may identify possible faces in the video frames, as described above.

Block 504 illustrates extracting feature points in the video frames. The extraction module 208 may extract the feature points in the video frames. Feature points may represent interest points on the video frames, as described above.

Block 506 illustrates inferring faces in video frames where faces were not originally detected based on comparing the feature points. The inferring module 212 infers faces in video frames where faces were not originally detected by the detection module 206, as described above. The inferring module 212 uses output from the comparing module 210 to infer the faces. For example, the feature points extracted from an anchor video frame may include at least one feature point that may be associated with a detected face. The comparing module 210 may identify feature points in a preceding and/or succeeding video frame. In at least one implementation, the detection module 206 did not detect a face in the preceding and/or succeeding video frame. In the at least one implementation, at least one of the feature points in the preceding and/or succeeding video frame is the same as the at least one feature point in the anchor video frame associated with the detected face. The inferring module 212 may infer that the detected face from the anchor video frame that is associated with the at least one feature point is also present in the preceding and/or succeeding video frame associated with the overlapping feature point.

Block 508 illustrates arranging video frames into groups. In at least one example, the identification module 124 may identify a set of identified faces as representing similar faces based on the face landmarks, as described above. Then, the identification module 124 may arrange the set of identified faces into a number of groups. In at least one example, each of the groups represents an identified face associated with a different subject. The video frames associated with the identified faces are arranged in groups associated with the different subjects.

Block 510 illustrates combining groups based at least in part on overlapping feature points. The merging module 216 may compare feature points associated with individual video frames in each of the groups and, if any feature points associated with an identified face overlap in any of the video frames in any of the groups, the merging module 216 may merge two or more groups with video frames having overlapping feature points into a single group associated with a particular subject. The resulting groups may be considered refined groups and each of the refined groups may include a set of video frames associated with a particular subject.

Figure 6:
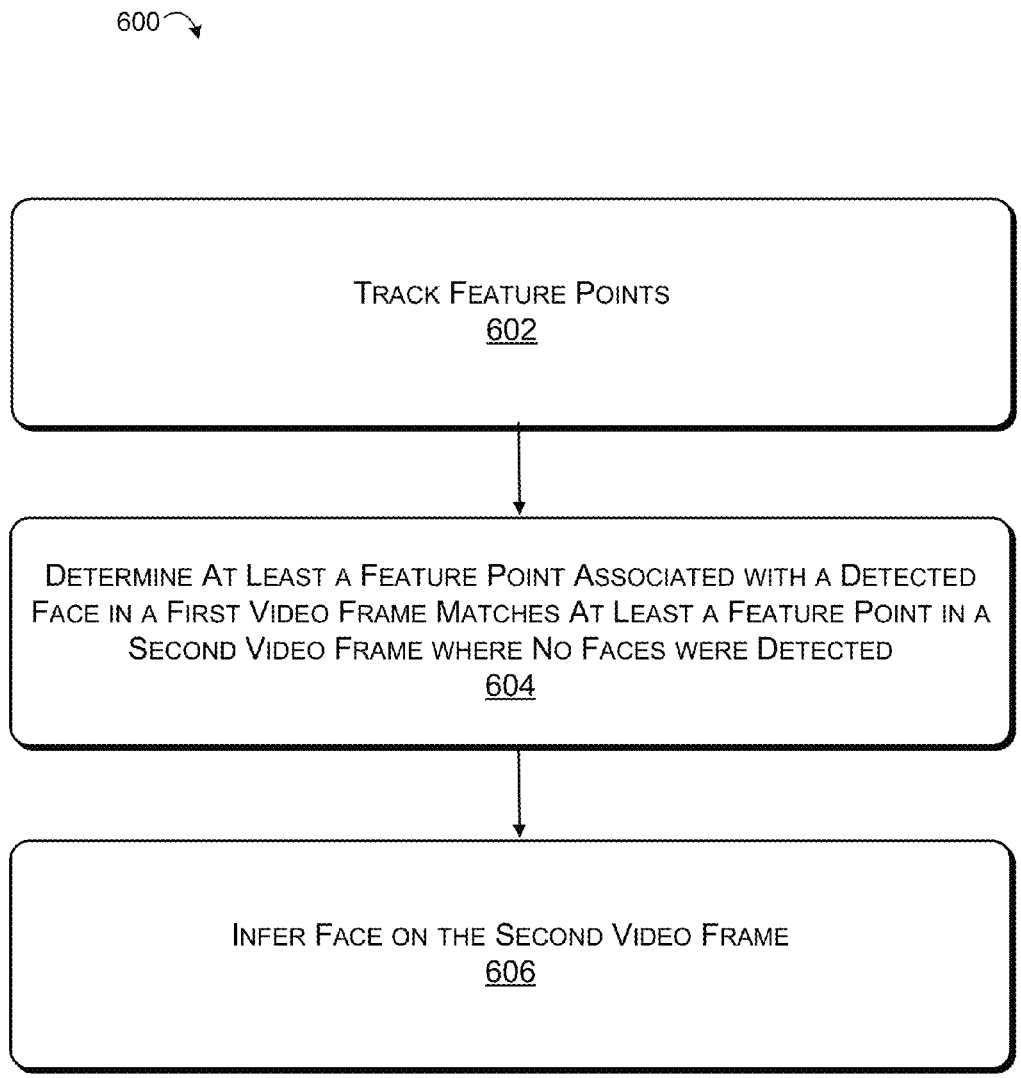
FIG. 6 illustrates a process for inferring faces based on feature point extraction.

FIG. 6 illustrates a process 600 for inferring faces based on feature point extraction.

Block 602 illustrates tracking feature points. In at least one example, the extraction module 208 may extract the feature points in the video frames, as described above. By following the movement of the feature points, the extraction module 208 may track the feature points from video frame to video frame.

Block 604 illustrates determining at least one feature point associated with a detected face in a first video frame matches at least one feature point in a second video frame where no faces were detected. In at least one example, the comparing module 210 may compare a video frame including a detected face and corresponding feature points with other video frames in the video file. The video frame including the detected face and corresponding feature points may be called an anchor video frame and may be the first video frame, as described above. The other video frames in the video file may precede the anchor video frame or succeed the anchor video frame and may represent the second frame, as described above. The detection module 206 may or may not have detected faces in the second video frame. However, in at least one implementation, one or more feature points in the second video frame may be the same as one or more feature points in the first video frame.

Block 606 illustrates inferring a face on the second video frame. The inferring module 212 uses output from the comparing module 210 to infer the detected faces on video frames where faces were not originally detected. At least one feature point associated with a detected face in the first video frame may overlap with at least one feature point in the second video frame where a face was not detected. Because of the overlapping feature points, the detected face may be inferred in the second video frame.

Figure 7:
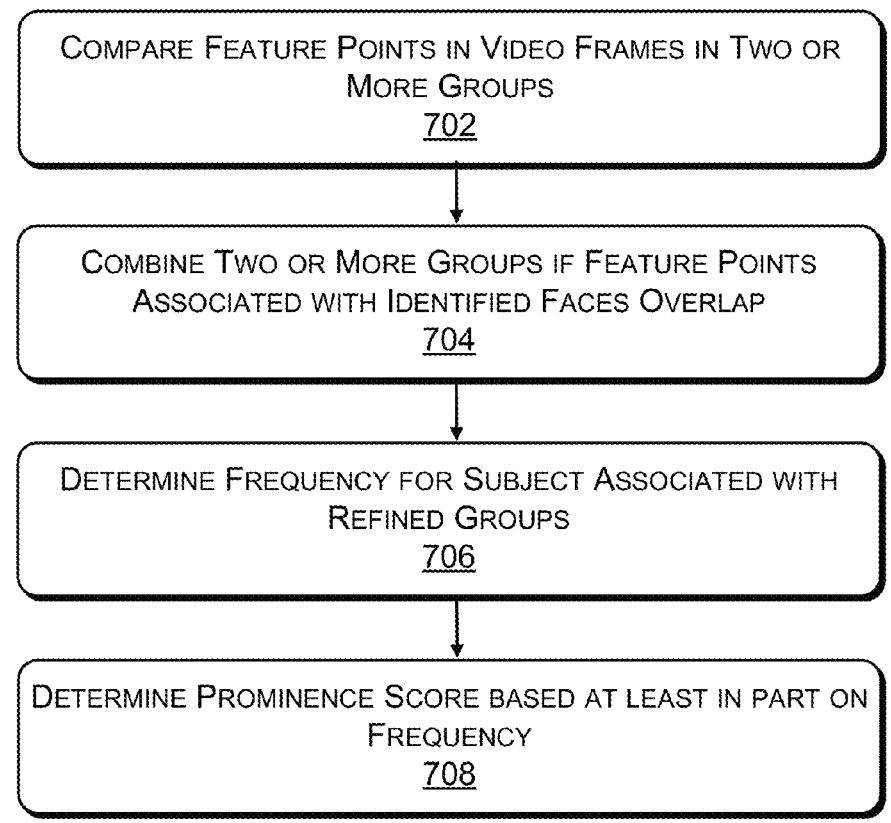
FIG. 7 illustrates a process for determining a prominence score based on a determined frequency.

FIG. 7 illustrates a process 700 for determining a prominence score based on a determined frequency.

Block 702 illustrates comparing feature points in video frames in two or more groups. As described above, the merging module 216 may compare feature points associated with individual video frames in each of the groups.

Block 704 illustrates combining two or more groups if feature points overlap. If any of the feature points associated with an identified face in any of the video frames in any of the groups overlap with feature points associated with an identified face in any other video frames, the merging module 216 may merge two or more groups having video files with overlapping feature points into a single group associated with a particular subject.

Block 706 illustrates determining a frequency for a subject associated with the refined groups. The frequency module 218 may determine frequency data representing the frequency of each of the subjects identified after processing by the merging module 216. The frequency may be determined by calculating a number of video frames on which an identified subject appears and dividing that number by the total number of video frames in a video file, as described above.

Block 708 illustrates determining a prominence score based at least in part on frequency. The scoring module 122 may calculate a prominence score associated with each of the identified subjects based on frequency, a size, and a position of each of the identified faces in the video content, as described above. The prominence score may also be based on other properties associated with the presentation of the identified faces (e.g., whether the identified faces appear sharp or blurry).

Conclusion

Although the subject matter has been described in language specific to structural features and/or methodological acts, it is to be understood that the subject matter defined in the appended claims is not necessarily limited to the specific features or acts described. Rather, the specific features and acts are described as illustrative forms of implementing the claims.

Conditional language such as, among others, "can," "could," "might" or "may," unless specifically stated otherwise, are understood within the context to present that certain examples include, while other examples do not necessarily include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

Example Clauses

A: A method comprising: extracting, by one or more computing devices, feature points from video frames of a video file; detecting, by at least one of the one or more computing devices, at least one face in at least a first video frame of the video frames; inferring, by at least one of the one or more computing devices, the at least one face in a second video frame of the video frames, the inferring based at least in part on the feature points; arranging, by at least one of the one or more computing devices, the video frames into groups; and combining, by at least one of the one or more computing devices, two or more groups to create refined groups, the combining based at least in part on the two or more groups each including one or more video frames having at least one overlapping feature point associated with a detected face or an inferred face.

B: The method as recited in paragraph A, wherein the inferring comprises: determining a first feature point associated with the at least one face in the first video frame matches a second feature point in the second video frame wherein no faces are detected in the second video frame; and inferring the at least one face on the second video frame based at least in part on the first feature point matching the second feature point.

C: The method as recited either paragraph A or paragraph B, wherein the arranging the video frames into the groups is based at least in part on similarity data associated with detected faces or inferred faces on the video frames.

D: The method as recited in any of paragraphs A-C further comprising, before combining the two or more groups, comparing feature points the video frames in the two or more groups.

E: The method as recited in any of paragraphs A-D, wherein each refined group in the refined groups is associated with a subject.

F: The method as recited in any of paragraphs A-E, determining a frequency associated with the subject, the determining comprising counting a number of video frames including the subject and dividing the number of video frames including the subject by a total number of video frames in a video file.

G: The method as recited in paragraph F, wherein the at least one face is associated with a set of face detail values, the face detail values including at least a size value and/or a position value associated with the at least one face.

H: The method as recited in paragraph G, further comprising, calculating a prominence score associated with the subject based at least in part on the size value, the position value, and/or the frequency associated with the subject.

I: A system comprising: memory; one or more processors operably coupled to the memory; and one or more modules stored in the memory and executable by the one or more processors, the one or more modules including: a face detection module configured to detect one or more faces associated with one or more subjects in video frames in video files; a feature detection module configured to extract feature points from the video frames and infer the one or more faces on the video frames; a grouping module configured to arrange individual video frames into groups based at least in part on face landmarks associated with the one or more faces, wherein individual groups represent an individual subject of the one or more subjects; and a scoring module configured to determining a prominence score associated with each individual subject.

J: The system recited in paragraph I, further comprising a post processing module configured to perform post processing operations including at least one of filtering the video files based at least in part on the prominence scores or ranking individual video files based at least in part on the prominence scores.

K: The system recited in either paragraph I or paragraph J, wherein the feature detection module is further configured to: track the feature points over the video frames; determine at least one feature point extracted from a first video frame of the video frames is associated with a detected face of the one or more faces; identify a second video frame of the video frames, wherein no faces are detected on the second video frame and at least one feature point is extracted from the second video frame; determine that the at least one feature point extracted from the first video frame and the at least one feature point extracted from the second video frame overlap; and infer the detected face on the second video frame based on the overlap of the at least one feature point extracted from the first video frame and the at least one feature point extracted from the second video frame.

L: The system recited in paragraph K, wherein the first video frame precedes the second video frame by one or more video frames.

M: The system recited in paragraph K, wherein the first video frame succeeds the second video frame by one or more video frames.

N: The system recited in any of paragraphs I-M, wherein the grouping module is further configured to: compare feature points on each of the individual video frames in the individual groups; and combine two or more individual groups to create a new group based at least in part on the two or more individual groups including individual video frames having at least one overlapping feature point associated with an identified face.

O: One or more computer-readable storage media encoded with instructions that, when executed by a processor, configure a computer to perform acts comprising: processing individual video files of plurality of video files, the processing comprising: detecting faces in some video frames of the individual video files; and extracting feature points from the video frames; inferring faces in individual video frames of the video frames, wherein no face was detected in the individual video frames, the inferring based at least in part on the feature points; arranging the individual video frames into a plurality of groups; combining two or more individual groups of the plurality of groups to create a set of refined groups, the combining based at least in part on the two or more individual groups including video frames having at least one overlapping feature point; identifying subjects associated with each of the refined groups; and determining a frequency associated with the subject, the frequency representing a number of video frames in which an individual subject of the subjects appears in a particular video file of the video files.

P: The one or more computer-readable storage media as recited in paragraph O, wherein the acts further comprise calculating a prominence score associated with the individual subject based at least in part on at least one of the frequency, a size value, and/or a position value.

Q: The one or more computer-readable storage media as recited in either paragraph O or paragraph P, wherein the acts further comprise receiving user input relating to user interaction with the plurality of video files R: The one or more computer-readable storage media as recited in paragraph Q, wherein the user interaction comprises filtering the plurality of video files to identify individual video files including a user specified subject, the filtering based at least in part on identifying the user specified subject in at least one of the combined groups.

S: The one or more computer-readable storage media as recited in paragraph Q, wherein the user interaction comprises ranking the individual video files, the ranking based at least in part on the prominence score.

T: The one or more computer-readable storage media as recited in paragraph Q, wherein the user interaction comprises identifying prominent video segments of the individual video files based at least in part on the prominence score.

What is claimed is:

1. A method comprising using one or more computing devices to implement:
   extracting a first feature point from a first video frame of a video file and a plurality of second feature points from a second video frame of the video file;
   detecting a portion of a body that identifies a subject in the first video frame, the portion of the body being different than the first feature point;
   associating the first feature point with the portion of the body in the first video frame;
   determining whether a spatial distance between a first location of the first feature point within the first video frame and a second location of each of the plurality of second feature points within the second video frame is less than a distance threshold, the distance threshold corresponding to a maximum distance that the portion of the body is estimated to move between the first video frame and the second video frame;
   inferring the portion of the body in the second video frame based at least in part on a determination that the spatial distance between the first location of the first feature point in the first video frame and the second location of a first one of the plurality of second feature points in the second video frame is less than the distance threshold;
   associating the first one of the plurality of second feature points with the portion of the body in the second video frame based at least in part on inferring the portion of the body in the second video frame; and
   arranging the first video frame and the second video frame into a group.

2. The method of claim 1 further comprising, prior to arranging the first video frame and the second video frame into the group:
   arranging the first video frame into a first group of video frames with at least a third video frame of the video file based at least in part on first similarity data between the first video frame and the third video frame; and
   arranging the second video frame into a second group of video frames with at least a fourth video frame of the video file based at least in part on second similarity data between the second video frame and the fourth video frame.

3. The method of claim 2 further comprising, prior to arranging the first video frame and the second video frame into the group:

comparing first feature points associated with each individual video frame in the first group with second feature points associated with each individual video frame in the second group; and determining that at least one feature point of the first feature points and at least one feature point of the second feature points substantially overlap.

4. The method of claim 1, wherein the group is associated with the subject.

5. The method of claim 4 further comprising, determining a frequency associated with the subject based at least in part on counting a number of video frames including the subject and dividing the number of video frames including the subject by a total number of video frames in the video file.

6. The method of claim 5, wherein the portion of the body is associated with a set of face detail values including at least a size value and a position value associated with the portion of the body.

7. The method of claim 6 further comprising, calculating a prominence score associated with the subject based at least in part on at least one of the size value, the position value, or the frequency associated with the subject.

8. The method of claim 1, further comprising:
determining the portion of the body is not detected in the second video frame;
wherein the determining whether the spatial distance between the first location of the first feature point in the first video frame and the second location of each of the plurality of second feature points in the second video frame is less than the distance threshold is in response to the portion of the body not being detected; and
wherein the inferring the face in the second video frame is in response to the portion of the body not being detected.

9. The method of claim 1, further comprising inferring the portion of the body is not located in the second video frame based at least in part on a determination that the spatial distance between the first location of the first feature point in the first video frame and the second location of each of the plurality of second feature points in the second video frame is not less than the distance threshold.

10. The method of claim 1, further comprising:
inferring that at least a second one of the plurality of second feature points in the second video frame is not associated with the portion of the body in the second video frame based at least in part on a determination that the spatial distance between the first location of the first feature point in the first video frame and the second location of at least the second one of the plurality of second feature points in the second video frame is not less than the distance threshold.

11. A system comprising:
memory;
one or more processors operably coupled to the memory; and
one or more modules stored in the memory and executable by the one or more processors, the one or more modules including:
a face detection module configured to detect a face associated with a subject in a first video frame in a video file;
a feature detection module configured to:
extract a first feature point from the first video frame and a plurality of second feature points from a second video frame in the video file, the first feature point and the plurality of second feature points being different than the face; and
associate the first feature point with the face in the first video frame;
determine whether a spatial distance between a first location of the first feature point within the first video frame and a second location of each of the plurality of second feature points within the second video frame is less than a distance threshold, the distance threshold corresponding to a maximum distance that the face is estimated to move between the first video frame and the second video frame;
infer the face in the second video frame based at least in part on a determination that the spatial distance between the first location of the first feature point in the first video frame and the second location of a first one of the plurality of second feature points in the second video frame is less than the distance threshold; and
associate the first one of the plurality of second feature points with the face in the second video frame based at least in part on inferring the face in the second video frame; and
a grouping module configured to arrange the first video frame and the second video frame into a group based at least in part on a relationship between the first feature point and the first one of the plurality of second feature points, wherein the group associates to the subject.

12. The system of claim 11, further comprising a scoring module configured to determine a prominence score associated with the subject.

13. The system of claim 12, further comprising a post processing module configured to perform post processing operations including at least one of filtering the video file and one or more other video files based at least in part on the prominence score or ranking the video file and the one or more other video files based at least in part on the prominence score.

14. The system of claim 11, wherein the first video frame precedes the second video frame by one or more video frames.

15. The system of claim 11, wherein the first video frame succeeds the second video frame by one or more video frames.

16. The system of claim 11, wherein the grouping module is further configured to:
determine that the first video frame is associated with a first group of video frames based at least in part on first similarity data;
determine that the second video frame is associated with a second group of video frames based at least in part on second similarity data;
compare first feature points associated with the first group of video frames with second feature points associated with the second group of video frames; and
combine the first group of video frames and the second group of video frames based at least in part on determining that the first feature point and the second feature point overlap under the criterion.

17. One or more computer-readable storage media encoded with instructions that, when executed by a processor, configure a computer to perform acts comprising:
processing individual video files of a plurality of video files, the processing comprising:
detecting a subject identifier of a subject in a first video frame of a video file of the individual video files;

extracting feature points from the first video frame; and determining that a first feature point of the feature points associates to the subject identifier;

determining whether a spatial distance between a first location of the first feature point within the first video frame and a second location of a second feature point of features points within the second video frame is less than a distance threshold, the distance threshold corresponding to a maximum distance that the subject identifier is estimated to move between the first video frame and the second video frame;

inferring the subject identifier in the second video frame based at least in part on determining that the first feature point and the second feature point overlap under the criterion a determination that the spatial distance between the first location of the first feature point in the first video frame and the second location of the second feature point in the second video frame is less than the distance threshold;

associating the second feature point with the subject identifier in the second video frame based at least in part on inferring the subject identifier in the second video frame;

arranging the first video frame and the second video frame in a group; and identifying the subject as associated with the group.

18. The one or more computer-readable storage media of claim 17, wherein the acts further comprise determining a frequency associated with the subject, the frequency representing a number of video frames in which the subject appears in the video file.

19. The one or more computer-readable storage media of claim 18, wherein the acts further comprise calculating a prominence score associated with the subject based at least in part on the frequency, a size value, and a position value.

20. The one or more computer-readable storage media of claim 19, wherein the acts further comprise receiving user input relating to user interaction with the plurality of video files.

21. The one or more computer-readable storage media of claim 20, wherein the user interaction comprises filtering the plurality of video files to identify individual video files including a user specified subject, the filtering based at least in part on the prominence score.

22. The one or more computer-readable storage media of claim 20, wherein the user interaction comprises ranking the individual video files based at least in part on the prominence score.

23. The one or more computer-readable storage media of claim 20, wherein the user interaction comprises identifying prominent video segments of the individual video files based at least in part on the prominence score.

* * * * *